(No Model.) 3 Sheets—Sheet 1.

G. E. GAY & J. H. PARSONS.
TROLLEY CATCHER.

No. 511,941. Patented Jan. 2, 1894.

Witnesses.
John A. Gardner
Harry W. Golder

Inventors.
George E. Gay
John H. Parsons (No Model.) 3 Sheets—Sheet 2.
G. E. GAY & J. H. PARSONS.
TROLLEY CATCHER.
No. 511,941. Patented Jan. 2, 1894.
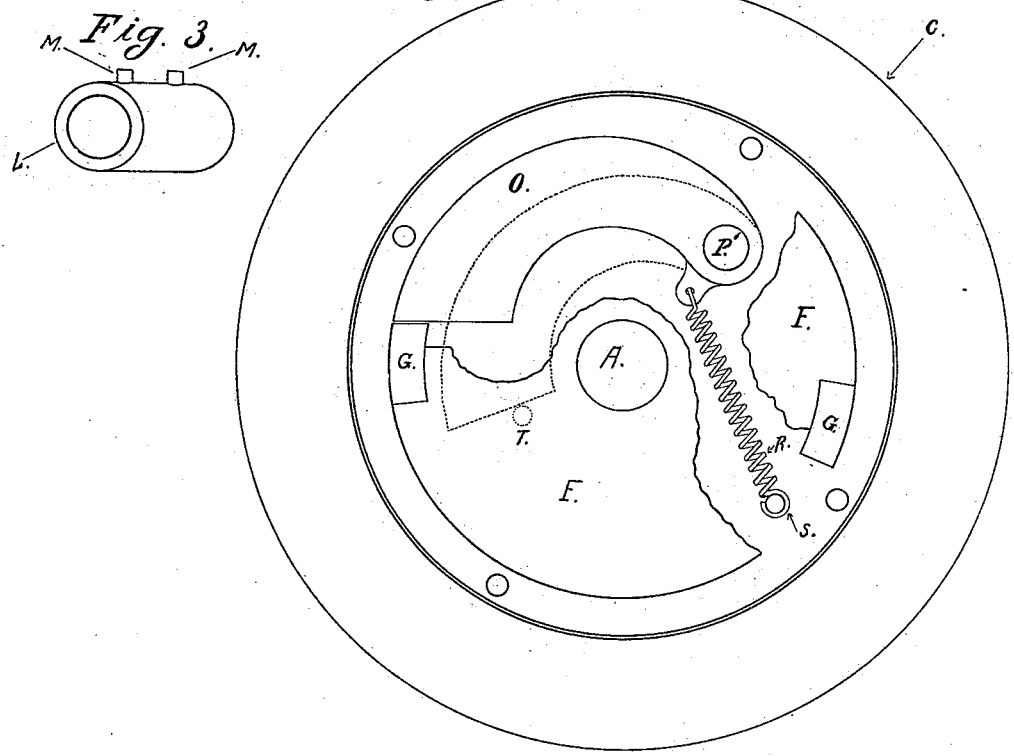
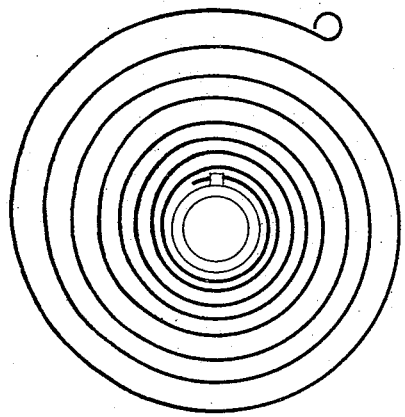
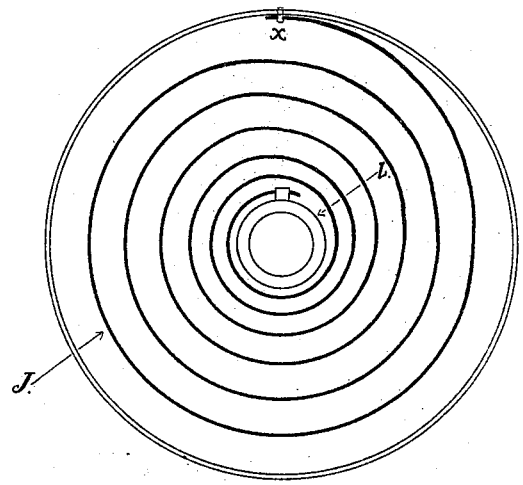
Witnesses.
John A. Gardner
Harry W. Golder
Inventors.
George E. Gay
John H. Parsons (No Model.) 3 Sheets—Sheet 3.

G. E. GAY & J. H. PARSONS.
TROLLEY CATCHER.

No. 511,941. Patented Jan. 2, 1894.

Witnesses.
John A. Gardner
Harry W. Golder

Inventors.
George E. Gay
John H. Parsons

UNITED STATES PATENT OFFICE.

GEORGE E. GAY AND JOHN H. PARSONS, OF AUGUSTA, MAINE.

TROLLEY-CATCHER.

SPECIFICATION forming part of Letters Patent No. 511,941, dated January 2, 1894.

Application filed February 28, 1893. Serial No. 464,044. (No model.)

*To all whom it may concern:*

Be it known that we, GEORGE E. GAY and JOHN H. PARSONS, citizens of the United States, residing at Augusta, in the county of Kennebec and State of Maine, have invented certain new and useful Improvements in Trolley-Rope Reels, of which the following is a specification.

The object of our invention is to provide means whereby the trolley rope may be automatically wound or unwound upon a drum or reel as the trolley is depressed or elevated in the course of following the varying heights of the trolley wire, and also to provide means for automatically stopping the reel when the trolley comes off from the trolley wire, and thereby preventing the trolley from rising farther above the trolley wire.

We are aware that various devices have been invented to catch the trolley and draw it down when it leaves the wire, and that in combination with such devices means have been provided for taking up the slack of the trolley rope. Our invention differs materially from any of those devices from the fact that it does not pull the trolley down, but simply stops the reel and holds the trolley from going farther above the wire when it runs off or leaves the wire, thereby requiring fewer parts, and making it much more simple, cheaper to make, easier to operate, and less liable to get out of order.

Our invention is clearly shown in the accompanying drawings, which with the letters of reference marked thereon form a part of this specification.

Figure 1:
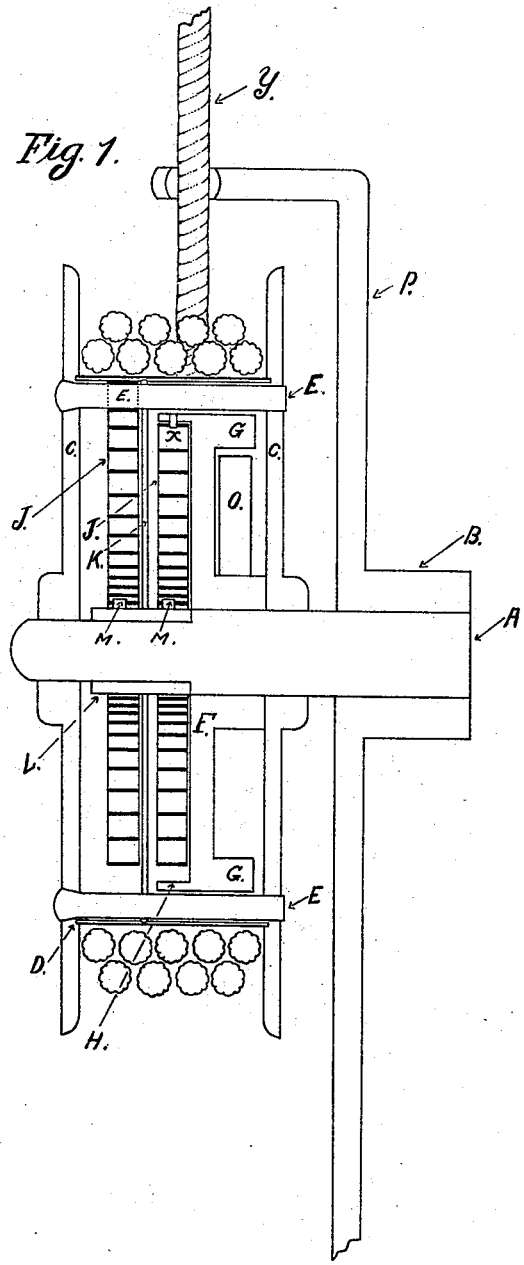
Figure 6:
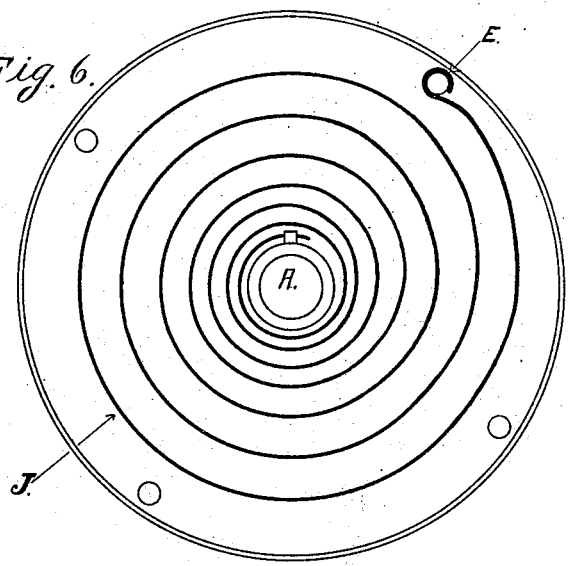
Figure 7:
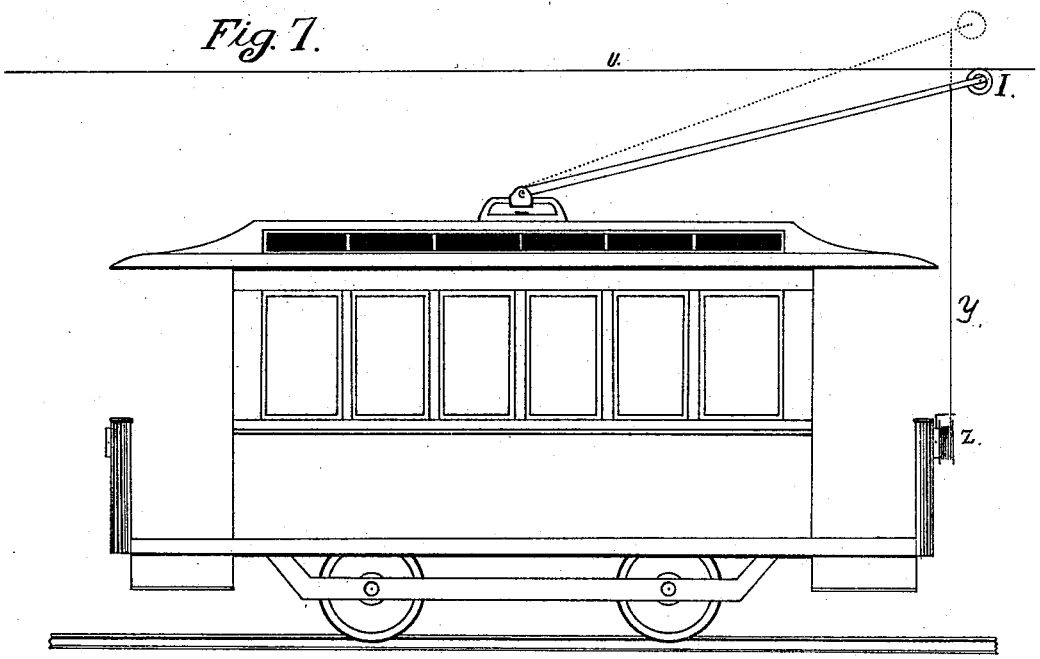

Figure 1 is a sectional side view of the reel complete. Fig. 2 is a sectional end view showing the mechanism for stopping the reel. Fig. 3 is a perspective view of the sleeve to which the springs are attached. Figs. 4 and 5 are end views of the drum operating springs. Fig. 6 is an end view of a modified form of drum operating spring. Fig. 7 is a side view of a car, showing the reel attached to the dashboard, and connected to the trolley with a cord or rope, the upper dotted position of the trolley and pole showing the position to which the trolley may rise, when it runs off from the wire before it is stopped by the reel.

P is a standard having its lower end adapted to be attached either permanently or removably to the end of a car, and having a spindle or shaft A, upon which the reel turns, projecting from its central part B, and having its upper end looped and projecting over the reel or drum thus forming a guide for the trolley cord or rope.

C. C. are the sides of the reel, separated by the drum D, and held together on to said drum by the rivets or screws E, E, thus forming the casing of the reel which revolves on the spindle or shaft A.

F is a disk securely fastened to the spindle A, and having on one side lugs or projections G. G. against which the dog O strikes when thrown out by centrifugal force when the reel revolves rapidly, and having on the other side a projection, or rim H forming a barrel for the spring J., and to which the outer end of the spring is fastened.

O is the dog for stopping the reel, pivoted at one end to the inner side of the casing C by means of a pin or lug P', and held in toward the center by means of spring R, the other end of said dog being adapted to swing out or away from the center by centrifugal force.

R is a spring, one end of which is attached to the inner side of the casing C by means of pin or lug S and the other end attached to the dog O in such a manner as to hold it in toward the center of the reel.

T is a stop projecting inward from the casing C, against which the dog O rests when held in by the spring R.

L is a sleeve turning freely on shaft A and is used to connect the inner ends of the two springs J. J. by means of lugs M. M. or other suitable means.

J. J. are springs having their inner ends fastened to sleeve L, the outer end of one spring being attached to the casing by means of rivet E, or screw, or other suitable means, and the outer end of the other spring being attached to the projection or rim H on disk F by rivet or screw X or other suitable method.

K is a metallic plate placed between the springs J. J. to prevent them from catching upon each other.

Y is the rope or cord connecting the trolley with the reel, and adapted to be wound on the reel.

Z shows the reel attached to a car.

U represents the trolley wire.

It will be seen by reference to the drawings that if the casing of the reel, which has the outer end of one spring attached to it, is turned in the right direction the spring will be wound up and the sleeve to which its inner end is fastened will be turned also, and as the sleeve has the inner end of the other spring also attached to it, and as the outer end of the other spring is immovably attached to the shaft A by means of an arm or disk F, both springs will be wound up. Thus it will be seen that by use of the sleeve L we are enabled to connect two springs in such a manner as to give us the travel or windage of both springs with practically the same tension as one, which is of great advantage where there is much variation in the height of the trolley wire. Where there is little variation in the height of the trolley wire a single spring may be used, as shown in Fig. 6, having the outer end of the spring attached to the drum or casing by rivet or screw E or other suitable means, and the inner end of the spring attached to the shaft A either directly or by means of a fixed sleeve. It will also be seen that as the dog O is attached to one side of the casing of the reel and turns with the reel, it will be held in toward the center by spring R and in position not to engage with the projections or lugs G. G. on the disk F which is rigidly attached to the shaft A when the reel is revolved slowly as in the normal rising and lowering of the trolley, but when the trolley runs or jumps off from the trolley wire and the reel is revolved quickly by means of the connecting trolley cord, the dog O is thrown outward by the centrifugal force overcoming the tension of the spring R and engages with projection or lug G thereby stopping the reel from turning and preventing the trolley from rising farther, in which position it is held until the trolley is pulled down when the springs J. J. will turn the reel in the opposite direction allowing the spring R to draw the dog O toward the center and away from the projection or lug G.

The application and operation of our device are as follows: The reel is attached to the car, either fixed or movably, a cord of sufficient length to reach from the reel to the highest point to which the trolley can be elevated has one end attached to, and is wound around the drum of the reel, the free end of the cord is then passed through the loop or guide on the standard P, and attached to the trolley I while the trolley is pulled down to its lowest point. Now if the trolley is allowed to rise slowly the reel will revolve thus winding up the springs, but if it should be allowed to rise quickly the reel would be revolved so rapidly as to throw outward the dog O and stop the trolley from rising higher as will happen when the trolley runs off or jumps from the wire. When the car is running in the usual manner the trolley follows the trolley wire, and whenever the trolley is depressed on account of the wire being low the springs J. J. revolve the reel and wind up the trolley cord, and when the trolley rises on account of high places in the wire the tension of the trolley pole overcomes the light tension of the reel spring and unwinds the trolley cord from the drum.

Having thus described the object and nature of our invention, what we claim as new, and desire to secure by Letters Patent, is—

In a trolley rope reel, the combination of a fixed shaft, a disk or arm having one or more projections on its side and rigidly attached to said shaft, the reel winding springs, a spring connecting sleeve, a casing or drum adapted to revolve on said shaft, a dog adapted to engage with the projections on the disk or arm when thrown outward by rapid turning of the reel, in connection with a trolley rope or cord, substantially as described.

In testimony whereof we have hereunto set our hands this 25th day of February, 1893.

GEORGE E. GAY.
JOHN H. PARSONS.

Witnesses:
JOHN A. GARDNER,
HARRY W. GOLDER.